June 26, 1962

R. M. LOVE ETAL 3,041,274

HEATING OF WATER AND MINING OF SULPHUR THEREWITH

Filed Jan. 30, 1958

INVENTORS.
ROBERT M. LOVE,
EDGAR C. WINEGARTNER,
HAMPTON G. CORNEIL,
ROY V. COMEAUX,
WARREN K. LEWIS,
BY Frank S. Troidl
ATTORNEY.

June 26, 1962 R. M. LOVE ETAL 3,041,274
HEATING OF WATER AND MINING OF SULPHUR THEREWITH
Filed Jan. 30, 1958 2 Sheets-Sheet 2

INVENTOR.
ROBERT M. LOVE,
EDGAR C. WINEGARTNER,
HAMPTON G. CORNEIL,
ROY V. COMEAUX,
WARREN K. LEWIS,
BY Frank S. Troidl
ATTORNEY.

3,041,274
HEATING OF WATER AND MINING OF SULPHUR THEREWITH

Robert M. Love, Roy V. Comeaux, Edgar C. Winegartner, and Hampton G. Corneil, Harris County, Tex., and Warren K. Lewis, Middlesex County, Mass., assignors to Humble Oil & Refining Company
Filed Jan. 30, 1958, Ser. No. 712,227
9 Claims. (Cl. 210—56)

This invention relates to the heating of water containing scale-forming solids and the prevention of scale deposition while the water is being heated. In its more particular aspects, this invention relates to a new process for heating sea water for use in the production of sulphur.

Naturally occurring water such as well water, river water, brackish water, and sea water all contain minerals to various extents. When these waters are heated, solids contained in the water tend to deposit from the water as a scale on surfaces in contact with the water. The scaling may consist of various compounds. However, the scale consists principally of one or more of the following compounds: (1) calcium carbonate, (2) magnesium hydroxide, and (3) calcium sulphate.

The decomposition of the bicarbonate ions causes the precipitation of calcium carbonate and magnesium hydroxide. Bicarbonate ions decompose into carbon dioxide gas, carbonate ions, and water according to the reaction:

$$2HCO_3^- \rightarrow CO_2 + CO_3^= + H_2O$$

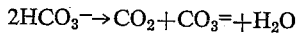

The carbonate ions react with the calcium ions to form calcium carbonate scale according to the reaction:

$$CO_3^= + Ca^{++} \rightarrow CaCO_3$$

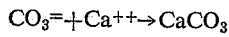

The carbonate ions also react with the water to form carbon dioxide gas and hydroxyl ions according to the reaction:

$$CO_3^= + H_2O \rightarrow CO_2 + 2(OH)^-$$

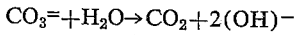

The hydroxyl ions react with the magnesium ions to form magnesium hydroxide scale according to the reaction:

$$2(OH)^- + Mg^{++} \rightarrow Mg(OH)_2$$

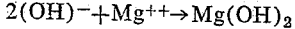

Since, for the formation of calcium carbonate and magnesium hydroxide the bicarbonate ion must decompose, it is possible to prevent calcium carbonate scale and magnesium hydroxide scale by preventing the decomposition of the bicarbonate ions. This is usually accomplished by the addition of an acid substance such as HCl in sufficient quantity to maintain the system acid enough to maintain the bicarbonate content of the system. Hence, the $CO_3^=$ ions will not be available to precipitate $CaCO_3$ or $Mg(OH)_2$.

The solubility of calcium sulphate decreases as the temperature of the water increases. The actual solubility depends upon the salinity of the water and its temperature. In general, the water becomes saturated with respect to calcium sulphate at some temperature below 315° F. Normal sea water, for example, apparently becomes saturated at about 250° F. Since the water becomes saturated with respect to calcium sulphate at a temperature below 315° F., a particular problem is presented when this water is heated for use in producing sulphur. Water used in producing sulphur is usually heated to a temperature above 315° F. before being introduced into the sulphur well. The required temperature to melt sulphur is about 245° F. To assure a temperature of 245° F. or more at the bottom of the well, it appears that the most economical temperature of the water added to the well is around 315° F., though operation at lower temperatures is possible. When injection water to the wells exceeds 340° F., the sulphur in the mine and well will be too viscous to flow easily. Sulphur becomes very viscous at 316° F.

In the production of sulphur, therefore, the problem is presented of raising the temperature of the heated water to about 315° F. and at the same time eliminating or reducing to a minimum the precipitation of the calcium sulphate. Since the waters become saturated at less than 315° F., this problem is a very difficult one to overcome.

A current process used to control the calcium sulphate content of heated waters is to heat the raw water in successively increasing temperature steps or stages starting from its natural temperature and ending with water having a temperature of 315° F. The water is forced into a first heating stage under superatmospheric pressure and the water heated to a temperature at which the calcium sulphate will not deposit as a hard scale. The water is then flowed into a second heating stage where it is heated to the temperature required for the production of sulphur.

It has been found in using the foregoing method of heating waters for use in sulphur mining that the addition of acid to the water permits the temperature to be raised to a higher level without the precipitation of scale. The acid influences the precipitation of calcium carbonate and magnesium hydroxide type scale. Existing processes do not teach how to maintain continuous operation of sea water heating facilities without encountering the deposition of calcium sulphate.

It is difficult to heat full strength sea water to a temperature of 315° F. by current methods. As the salinity of the water increases, the calcium and sulphate contents also increase, and it becomes much more difficult to heat the water to temperatures above 300° F. without encountering severe scale deposition problems.

The process described herein is an entirely new approach to the problem of preventing calcium sulphate deposition. In our new method of heating sea water, the water is purposely heated to a temperature to supersaturate the water with respect to calcium sulphate before the water is introduced into the well to produce sulphur. The supersaturated water is held in a retention vessel such as a crystallizer for a period long enough to precipitate a substantial amount of the calcium sulphate from the water. After the calcium sulphate is precipitated, the water is cooled somewhat, after which its calcium sulphate content is below the saturation value. The resulting water, undersaturated with respect to calcium sulphate, will not scale the pipes and equipment used in the sulphur well.

Referring to the drawings.

Figure 1:
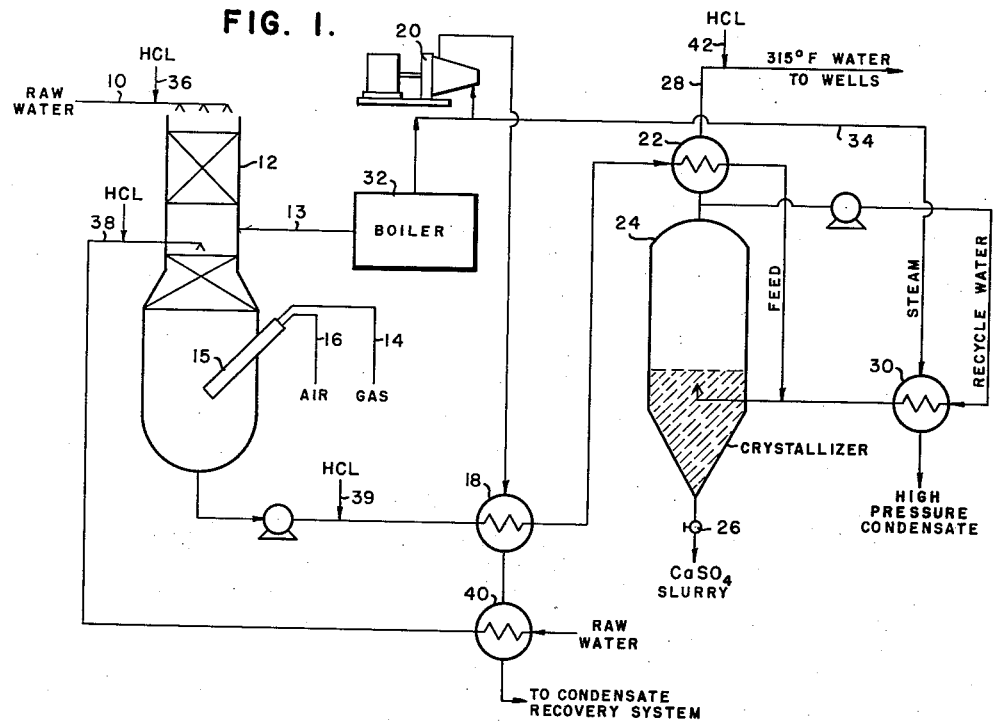
FIG. 1 is a schematic flow diagram illustrating one system for practicing our new process.

Referring to FIG. 1, raw water is fed through line 10 and sprayed into a deaerator tower 12. The water is heated first by contact with flue gas conducted to the tower from a boiler 32 through conduit 13. Near the center of the tower additional raw water is added to tower 12 after being preheated in exchanger 40. The water than passes through a packed section of the tower where it contacts hot gases produced by a burner 15 which receives gas and air through lines 14 and 16, respectively. The deaerator tower serves to preheat the raw water and also to remove dissolved oxygen from the raw water.

The removal of the dissolved oxygen from the water renders the water substantially non-corrosive.

The water from the deaerator tower 12 is then pumped under superatmospheric pressure through the tubes of heat exchanger 18 where it is heated by condensing steam from mechanical drivers 20 to some temperature such that the temperature leaving heat exchanger 22 connected in series with heat exchanger 18 is such that precipitation of calcium sulphate will not occur, say 280° F., if the raw water is sea water.

A necessary component of our new process is the use of a retention vessel such as a crystallizer 24. When sea water is used for sulphur mining, the crystallizer 24 is operated at some temperature well above 315° F., at which the water is supersaturated with respect to calcium sulphate. Sufficient residence time is provided for the precipitated calcium sulphate to form and settle in the vessel. The calcium sulphate is settled in the bottom of the crystallizer 24 in the form of a mud or a slurry of calcium sulphate crystals. The calcium sulphate mud or slurry may be withdrawn from the bottom of the crystallizer intermittently by opening a vlave 26.

The water from the top of the crystallizer 24 is divided into two streams. A portion of the water is cooled to a temperature lower than that of the crystallizer and preferably to a temperature between 315° F. and 330° F. by heat exchange with the incoming water in exchanger 22 and is sent to the sulphur wells through line 28. This water is then substantially undersaturated with respect to calcium sulphate. The balance of the water is pumped through a recirculating system where it is heated with steam in heat exchanger 30 to some temperature such that the temperature of the combined recycle and fresh feed stream is the temperature desired in the crystallizer 24. Calcium sulphate scaling does not take place in exchanger 30 due to the low degree of supersaturation of the water and to the short time during which the water is in the exchanger. The steam used to heat the recycled water may be obtained from boiler 32, the steam being fed to the exchanger 30 through steam line 34.

If desired, some of the steam produced by boiler 32 can be used to generate power or drive prime movers in such a device as indicated by turbine generator 20. Exhaust steam from these devices is condensed in exchangers 18 and 40. Exhaust steam in excess of that which can be condensed in exchanger 18 is condensed by heat exchange with raw water in exchanger 40.

The water from exchanger 22 is combined with a volume of supersaturated recycled water from exchanger 30 and at a temperature such that the mixture is at the temperature desired for operation of the crystallizer.

Using this process, the scale forming material, calcium sulphate, is actually removed from the system and disposed of without the necessity of chemical treatment. As formerly stated, calcium sulphate presents a scale problem because it becomes less soluble as the temperature increases. Around 300° F. the temperature-solubility curve is fairly steep, that is, there is a large drop in solubility for each increment of temperature rise. Around 400° F. the curve becomes much flatter and the drop in solubility of calcium sulphate is much less for each increment of temperature rise. This makes it possible to increase the temperature of the recirculated water substantially in exchanger 30 without seriously increasing the supersaturation. Due to the change in slope of the curve, however, the degree of supersaturation is greatly increased when the incoming water is added to the recirculated stream at the crystallizer and therefore, crystallization tends to take place in the crystallizer where it is desired. Since the product water leaving the exchanger 22 is cooler than it was when it came to equilibrium in the crystallizer, it is undersaturated with respect to calcium sulphate, and scaling cannot take place downstream from this point.

The control of calcium carbonate and magnesium hydroxide scaling may be obtained by the addition of hydrochloric acid. The hydrochloric acid may be added at one or more of various points in the system, such as points 36, 38, 39, and 42.

Various combinations of crystallizer temperature and recycle rate are possible, and the final choice will depend on the detailed economics of the specific plant installation. In general, higher crystallizer temperatures are advantageous due to more rapid and complete crystallization in the crystallizer. The degree of supersaturation in exchanger 30 is a function to some extent of the temperature in the crystallizer. However, it is essentially a function of the temperature increase of the water across the exchanger 30. If there is a high ratio, say 5:1, of the water rate through exchanger 30 to the incoming water rate or outgoing water rate through exchanger 22, the temperature increase in exchanger 30 will be low. If the ratio is low, say 2:1, then the temperature increase across exchanger 30 will be large and a greater possibility will exist for calcium sulphate precipitation in exchanger 30. In general, crystallizer temperature can vary from 315° F. to 550° F. and the recycle ratio from 1:1 to 5:1 by volume of water from exchanger 30 with respect to water from exchanger 22. Sufficient pressure is held on crystallizer 24 to prevent vaporization or boiling of the water in the vessel and the heat exchangers attached thereto.

As an example of the process shown in FIG. 1, consider a plant using normal sea water with the crystallizer operating at 375° F. and with a recycle rate of 1:1. The water is preheated to 190° F. in tower 12. Some 27 B.t.u.'s per pound would be supplied by exchanger 18. Heat exchange from the product water in exchanger 22 will supply 63 of the 90 B.t.u.'s per pound required to heat the water leaving exchanger 22 to 280° F. The 280° F. water will be combined with an equal volume of recycled water from exchanger 30 at a temperature of 464° F. to supply water at 375° F. to the crystallizer 24.

The equilibrium reaction of the $Ca^{++}$ ions and the $SO_4^=$ ions at saturation in water may be represented by the following chemical equation:

$$CaSO_4 \rightleftharpoons Ca^{++} + SO_4^=$$

The $CaSO_4$ saturation of the water is represented by the formula:

$$k = [Ca^{++}] \cdot [SO_4^=]$$

in which $k=$ a constant depending on (1) the nature of the reacting substances, (2) the temperature, and (3) the solvent in which the reaction occurs. $[Ca^{++}]$ and $[SO_4^=]$ represent the concentrations of calcium and sulphate ions, respectively, expressed in terms of chemical equivalents.

The equilibrium condition for this reaction at a given temperature is independent of the concentration of the individual reactants.

The value of $k$ in the above formula for calcium sulphate decreases with increasing temperature. This means that at higher temperatures, precipitation is more likely to occur than at lower temperatures.

The water in crystallizer 24, being at 375° F. in the above example, would be supersaturated with respect to calcium sulphate (the product of the $Ca^{++}$ and $So_4^=$ ions would be greater than the equilibrium or saturation product) and calcium sulphate slurry would be formed in the crystallizer. The water fed to the wells, having been cooled in heat exchanger 22 and having had some of the $Ca^{++}$ and $SO_4^=$ ions removed in crystallizer 24, is undersaturated.

Figure 2:
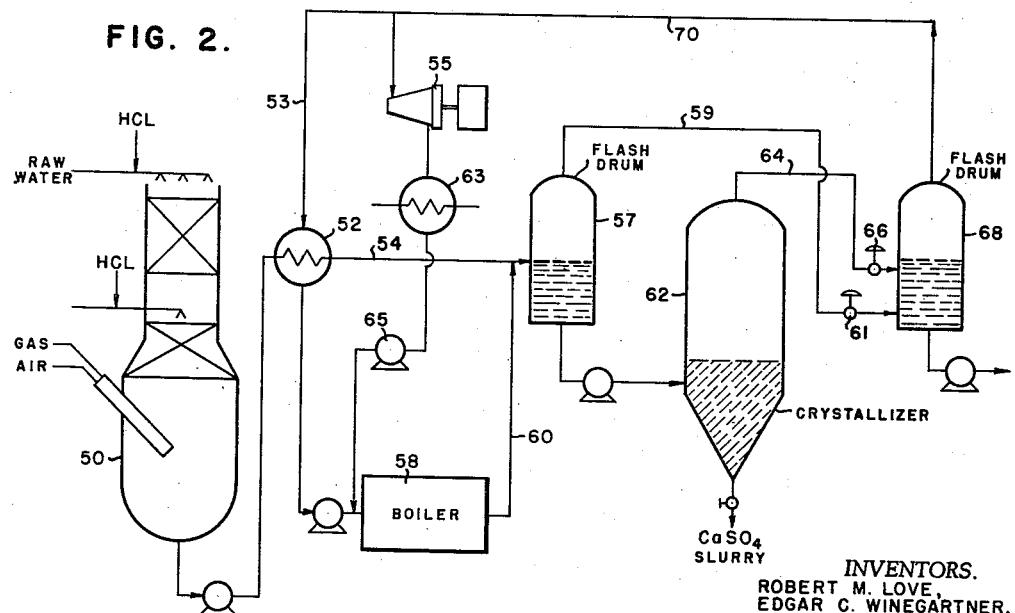
FIG. 2 is a schematic flow diagram illustrating a second system for carrying out our new process.

In the system shown in FIG. 2, the deaerated water from deaerator tower 50 is pumped to a heat exchanger 52. The deaerated water is heated in heat exchanger 52 with steam under pressure to provide heated water having a higher temperature at line 54 from heat exchanger 52. The temperature is not high enough to precipitate calcium sulphate, say between 250° F. to 280° F. Sufficient steam is provided through line 53 to maintain proper heat balance in exchanger 52, any remaining steam being fed to a turbine drive 55 through a separate line. The steam is condensed in condenser 63 and the condensate pumped by means of pump 65 to a boiler 58.

The condensate pumped to boiler 58 is evaporated and superheated under pressure in the boiler and fed through line 60 to line 54 where the superheated steam is mixed with the heated water under pressure to condense at least a major portion of the superheated steam to provide a liquid mixture having a temperature in the desired range of 315° F. to 550° F. The mixture is fed to a flash drum 57. To maintain heat balance in the system it may be necessary to flash off a portion of the liquid in drum 57 as steam. The steam flashed off is fed through line 59 and pressure reducing valve 61 to flash drum 68.

The liquid mixture is then pumped to a retention vessel or crystallizer 62 which is under pressure and has sufficient retention time to effect substantially complete precipitation of the supersaturation of calcium sulphate content of the liquid mixture.

The mixture is passed from the top of the crystallizer 62 through line 64 and a pressure reducing valve 66 to the flash drum 68. The flash drum is maintained at the vapor pressure of the sea water and at the desired final temperatuer (about 84 p.s.i.a. for 315° F.) An amount of steam is flashed off from flash drum 68 and fed to the heat exchanger 52 through steam line 70. By utilizing the flash drum 68 to supply the steam for heating the feed water, a separate source of water is made unnecessary.

Examples of operating conditions which are in heat and material balance are set out below:

|  | All Steam Condensed in Drum 57 | Drums 57 and 58 at 375° F. and 184 p.s.i.a. |
|---|---|---|
| Temp. of drum 57 and vessel 62, °F | 420 | 375 |
| Pressure of drum 57 and vessel 62, p.s.i.a | 310 | 184 |
| Temp. of steam in line 60, °F | 1264 | 975 |
| Pressure of steam in line 60, p.s.i.a | 310 | 184 |
| Lbs./hr. of steam in line 60 | 14.2 | 20.4 |
| Lbs./hr. of steam in line 59 | 0 | 13.0 |
| Lbs./hr. of steam condensed in drum 57 | 14.2 | 7.4 |
| B.t.u. content of steam in line 60 | 1,641 | 1,501 |
| Lbs./hr. of steam through turbine 55 | 0 | 6.2 |
| Percent dilution of seawater in vessel 62 | 14.2 | 7.4 |

Figure 3:
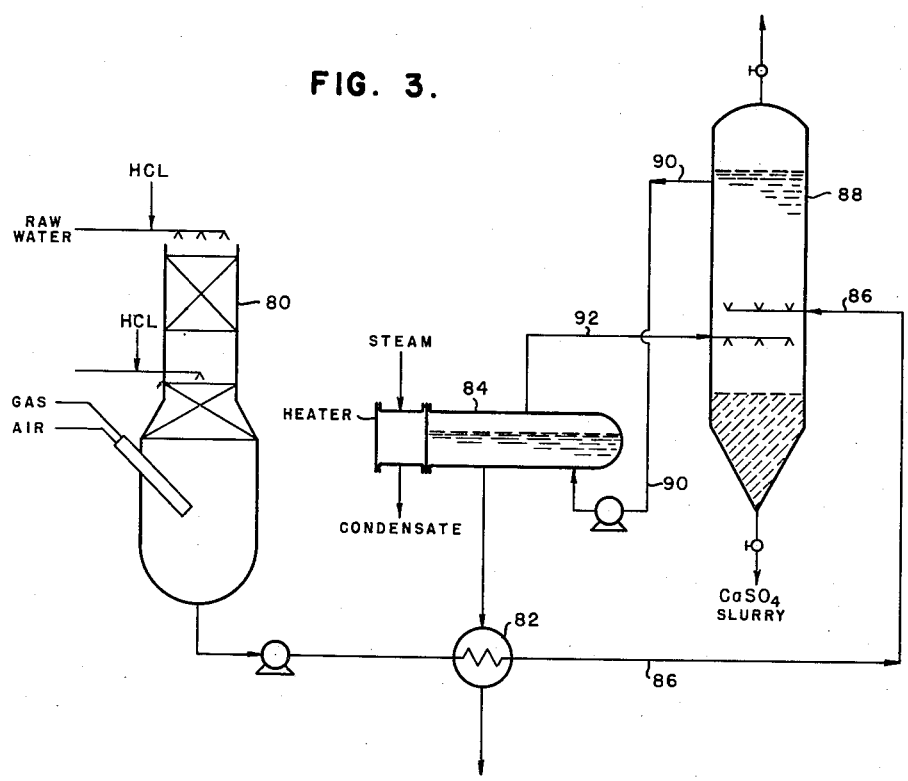
FIG. 3 is a schematic flow diagram illustrating still another system for carrying out the process.

A third system which may be used in carrying out our new process for heating water for use in sulphur mining is shown in FIG. 3. In FIG. 3 the deaerated water from deaerator 80 is pumped to an exchanger 82 to exchange heat with hot water flowing from a heater 84, to be subsequently described. The water charge stream leaving exchanger 82 through line 86 has picked up heat and is charged into a retention and precipitation vessel 88 where, by virtue of a retention period of about 10 minutes to 3 hours, the calcium sulphate supersaturation of the water is eliminated by settling the precipitated calcium sulphate to the bottom of the precipitating vessel.

The temperature of the water is raised in vessel 88 from the incoming temperature to the desired temperature for precipitating the calcium sulphate by condensing steam which is produced in the heater 84.

In heater 84 the water is boiled by exchange with condensing steam or some other source of heat to produce steam which is then delivered into the bottom of the precipitation vessel 88 through line 92 to effect the heating of the sea water. The water leaving the precipitation vessel 88 is pumped through line 90 to the heater 84 so that the heater operates at a slightly higher pressure than the precipitation vessel 88. This will provide a driving pressure force for flowing the steam from the heater to the precipitation vessel through line 92.

The water leaving the bottom of heater 84 is at a temperature substantially higher than the desired temperature of between 315° F. and 330° F. for sulphur mining. Consequently, this water exchanges heat with the incoming raw water in exchanger 82 to reduce the temperature of the outgoing water product to the desired temperature. This produces a product water undersaturated with respect to calcium sulphate.

Although various systems have been illustrated for carrying out our new process, various other systems may be used without departing from the scope of the appended claims.

We claim:

1. A process for heating waters for use in sulphur mining comprising: heating the water at a pressure sufficient to prevent excessive evaporation to a temperature sufficiently high to supersaturate the water with respect to calcium sulphate and precipitating the calcium sulphate supersaturation in the form of solids; removing said solids; and thereafter flowing at least a portion of the water to a temperature lowering means to lower the temperature of the water to provide heated water substantially undersaturated with respect to calcium sulphate.

2. A process in accordance with claim 1 wherein the water is heated to a temperature in the range of 315° to 550° F. to precipitate the calcium sulphate supersaturation.

3. A process in accordance with claim 2 wherein the heated water is lowered to a temperature in the range of 315° to 330° F., the particular temperature to which the heated water is lowered being sufficiently below the particular temperature to which it was previously heated to provide the water substantially undersaturated with respect to calcium sulphate.

4. A process for heating waters for use in sulphur mining comprising: heating the feed water under pressure to a temperature such that calcium sulphate scaling will not occur; mixing said feed water with water having a temperature and volume sufficient to provide a water mixture having a temperature in the range of 315° to 550° F.; thereafter feeding said water mixture to a retention vessel under pressure and having a retention time sufficient to precipitate substantially all the supersaturation of calcium sulphate content of the mixture; removing said precipitated calcium sulphate; and flowing at least a portion of the water to a temperature lowering means to cool the mixture to a temperature to provide heated water substantially undersaturated with respect to calcium sulphate.

5. A process for heating water for use in sulphur mining comprising: preheating and deaerating the feed water at atmospheric pressure; thereafter flowing the preheated water through a heat exchanger to further heat the water to a temperature below the temperature at which calcium sulphate tends to precipitate; then steam heating the water under pressure to a temperature between 315° and 550° F. in a retention vessel having sufficient retention time to precipitate substantially all the supersaturation of calcium sulphate in the water; removing said precipiated calcium sulphate; feeding the saturated water to a heater to produce from a portion thereof steam which is fed back to the retention vessel; and flowing the remainder of the saturated water to a temperature lowering means to cool said remainder to a temperature to provide heated water substantially undersaturated with respect to calcium sulphate.

6. A process for heating saline waters for use in sulphur mining comprising: heating and deaerating the water; feeding the heated and deaerated water under superatmospheric pressure to at least one heat exchanger to further heat the feed water to a temperature such that calicum sulphate scaling will not occur; mixing said feed water with superheated water having a temperature and volume sufficient to provide a water mixture having a temperature in the range of 315° to 550° F.; thereafter feeding said water mixture to a retention vessel under pressure and having a retention time sufficient to cause precipitation of substantially all the supersaturation of calcium sulphate content of the mixture whereby water is fed from the retention vessel saturated with respect to calcium sulphate; removing said precipitated calcium sulphate; thereafter dividing the saturated water into two streams; cooling one stream in a heat exchanger to a temperature at which it is undersaturated for use in sulphur mining; flowing the other stream to a second heat exchanger where it is superheated with steam under pressure to provide the said superheated water for mixing with the feed water.

7. A process for heating saline waters for use in sulphur mining comprising: deaerating the saline water; passing the deaerated water to a heat exchanger and heating the water with steam under pressure to provide water having a temperature of about 250° F. at one outlet of the exchanger and condensed steam at another outlet; thereafter superheating the condensed steam under pressure; mixing the superheated steam with the 250° F. water under pressure to condense at least a major portion of the superheated steam to provide a liquid mixture having a temperature in the range of 315° F. to 550° F.; passing the liquid mixture to a retention vessel which is under pressure and having sufficient retention time to effect substantially complete precipitation of the supersaturated calcium sulphate content of the liquid mixture; removing said precipitated calcium sulphate; thereafter passing the mixture through a pressure reducing means to a flash drum to reduce the temperature of the water, whereby steam is flashed off and fed to said heat exchanger, and heated water of the proper temperature for sulphur mining and substantially free of calcium sulphate is provided.

8. A process for heating waters for use in sulphur mining comprising: mixing steam under pressure with the water to heat the water to a temperature sufficiently high to supersaturate the water with respect to calcium sulphate and precipitating the calcium sulphate supersaturation in the form of solids; the pressure being high enough to prevent excessive evaporation; removing said solids and thereafter flowing the water to a temperature lowering means to lower the temperature of the water to provide heated water substantially undersaturated with respect to calcium sulphate.

9. A process in accordance with claim 8 wherein the supersaturation temperature is between 315° and 550° F.

References Cited in the file of this patent

UNITED STATES PATENTS

| | | |
|---|---|---|
| 2,698,225 | Svanoe | Dec. 28, 1954 |
| 2,756,035 | Axelrad | July 24, 1956 |
| 2,756,207 | Axelrad | July 24, 1956 |
| 2,756,208 | Axelrad | July 24, 1956 |
| 2,817,504 | Axelrad | Dec. 24, 1957 |
| 2,856,074 | Dubitzky | Oct. 14, 1958 |